US007039511B1

(12) United States Patent
Kreuz et al.

(10) Patent No.: US 7,039,511 B1
(45) Date of Patent: May 2, 2006

(54) VEHICLE ELECTRICAL INSTALLATION CONFIGURATION SYSTEM

(75) Inventors: Ingo Kreuz, Herrenberg (DE); Ulrike Bremer, Aachen (DE); Zhongkun Zhang, Saarbruecken (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/009,365

(22) PCT Filed: Apr. 27, 2000

(86) PCT No.: PCT/EP00/03819

§ 371 (c)(1),
(2), (4) Date: Apr. 29, 2002

(87) PCT Pub. No.: WO00/77692

PCT Pub. Date: Dec. 21, 2000

(30) Foreign Application Priority Data

Jun. 9, 1999  (DE) ................................ 199 26 206

(51) Int. Cl.
*G06F 19/00* (2006.01)
(52) U.S. Cl. .......................................... 701/36; 701/29
(58) Field of Classification Search ................. 701/36, 701/29
See application file for complete search history.

(56) References Cited

U.S. PATENT DOCUMENTS 5,521,588 A * 5/1996 Kuhner et al. ......... 340/825.22
5,999,908 A * 12/1999 Abelow .......................... 705/1
6,331,762 B1 * 12/2001 Bertness ...................... 320/134

FOREIGN PATENT DOCUMENTS

DE        43 15 494 C1   9/1994
WO        WO 99/57837    11/1999
WO        WO 00/74019    12/2000

OTHER PUBLICATIONS

Deutsche Telekon AG, "Kundenspezifische Konfiguration von Telekommunikationssystemen" ("Customized Configuration of Telecommunication Systems"), Darmstadt Technologiezentrum (Darmstadt Technology Center), Jul. 1997, pp. 1-9.
Dr. Andreas Guenter, "Wissensbasiertes Konfigurieren: Ergebnisse aus dem Projekt Prokon" ("Knowledge-Based Configuring: Results from the Project Prokon"), 1995, pp. vi-viii, Infix Publishing, St. Augustin, ISBN 3-929037-96-3.

(Continued)

Primary Examiner—Thomas G. Black
Assistant Examiner—Christine M. Behncke
(74) Attorney, Agent, or Firm—Crowell & Moring LLP (57) ABSTRACT

The invention relates to an automobile electrical installation configuration system for automatically configuring the electrical installations in automobiles, comprising hardware components connected at least partially to a data bus network and software components installed in at least part of said hardware components for executing corresponding functions. According to the invention, a central actual configuration data storage is provided, which is mounted on the vehicle side, for retrievable storage of an actual configuration data set characterizing the actual configuration of the corresponding electrical installations of the vehicle, whereby the storage directly or indirectly communicates with all hardware components. The system additionally or alternatively includes a topology configuration system part, a hardware component configuration system part and a vehicle configuration system part, in addition to a graphic user interface for menu-controlled user guidance. The inventive system can be used, for instance, for automatic client-specific configuration of electrical installations in automobiles.

18 Claims, 9 Drawing Sheets

OTHER PUBLICATIONS

I. Kruez et al., "Intelligent Configuring System", Automotive Electronics and New Products 31st ISATA Proceedings, Jun. 1998, pp. 218-227, Dusseldorf, Germany, ISBN: 0953257657.

M. Heinrich et al., "The Resource-Based Paradigm: Configuring Technical Systems from Modular Components", 1996 Fall Symposium, Nov. 1996, pp. 1-9.

Judy Crow et al., "Model-Based Reconfiguration: Diagnosis and Recovery", NASA Contractor Report 4596, May 1994, pp. 1-59, USA.

Raymond Reiter, "A Theory of Diagnosis from First Principles", Artificial Intelligence, 1987, pp. 57-96, Elsevier Science Publishers B.V., North-Holland.

*Elektronik* entitled "Der Internet-Zugriff aufs Lon" by T. Klesper, pp. 60, 62, 64, 66, 67, 68.

*IEEE Transactions on Consumer Electronics* entitled "Browser-Style Interfaces to a Home Automation Network" by P.M. Corcoran et al., pp. 1063-1069.

*NTZ Nachrichtentechnische Zeitschrift, VDE Verlag GmbH* entitled "XML mit neuen Moeglichkeiten" by J. Harbarth, pp. 36-38.

Kreuz, I; Roller, D; Forchert, T.: "Object Oriented Configuring of Hierarchically Modelable, Electrical and Electronic Systems"; 98AE022; XP009048708;1998; pp. 219-226 *Zusammenfassung*.

Kreuz, I.; Bremer, U.: "Onboard Documentation of Electrical and Electronic Systems consisting of ECUs, Data Buses and Software"; XP009048707; 1999; sections 5.2.1-5.2.8 *Zusammenfassung*.

* cited by examiner

VEHICLE ELECTRICAL INSTALLATION CONFIGURATION SYSTEM

BACKGROUND AND SUMMARY OF THE INVENTION

The invention relates to a vehicle electrical system configuration system for the automatic configuration of vehicle electrical systems, which comprise hardware components at least partially connected to a data bus network and software components implemented in at least a portion of the hardware components for the execution of corresponding functionalities. The term hardware components, as used in this context, refers to all the various control devices (frequently abbreviated as ECU), including corresponding parts and peripheral equipment, such as line connections, data buses, connections, sensors, and actuators. Each software component that fulfills a corresponding functionality can be implemented in one, or distributed in several, of the hardware components.

Systems for the automatic configuration of vehicle electrical systems should support the structure of the system, in that they determine the most optimal system configuration possible within the context of existing options and marginal conditions established with respect to set criteria, preferably by means of a knowledge-based method in which all knowledge relevant to configuration is stored in a corresponding Knowledge Base database. Such systems have, for example, been proposed for the configuration of PC systems and telephone systems. With regard to the latter, see the publication by Uellner et al., titled *"Customer-Specific Configuration of Telecommunications Systems—The KIKon Project,"* Deutsche Telekom A G, Darmstadt Technology Center. Information on the general principles of knowledge-based configuration can be found, for example, in the publication by A. Günter (publisher), titled *"Knowledge-Based Configuration—Results of the PROKON Project,"* Infix Publishing, St. Augustin 1995.

The electrical/electronic component, i.e., the portion of electrical and electronic components, which constitute the vehicle's electrical system, is constantly increasing in modern motor vehicles. The wide variety of vehicle electrical systems, which is the simplified term used here in referring to the totality of electrical and electronic components, is due to such factors as different vehicle manufacturers, different operating requirements in different countries, as well as different models and equipment options from the same manufacturer. Consequently, there is a need for a vehicle electrical system configuration with which a vehicle electrical system can be configured, essentially independently, according to a customer's needs, within the scope of existing conditions, and at the highest possible degree of automation. With the system, the current configuration, i.e., the actual configuration, can be obtained and displayed as effectively as possible for the benefit of, for example, service personnel. There is also a need for the ability to reconfigure the respective actual configuration, in the event of the replacement of system components or the addition of new components for new functionalities, in as non-contradictory and independent a manner as possible.

The basic elements of a vehicle electrical system configuration system are described in the publication by I. Kreuz et al., titled *"Intelligent Configuring System, Proceedings of the 31$^{st}$ ISATA, Automotive Electronics and New Products,"* Düsseldorf, Germany, Jun. 2–5, 1998. The configuration process chain described therein contains a set of possible configurations specified on the development end and a set of permissible configurations derived from the first set after having factored in limiting marketing strategies, from which, depending on a customer's needs, a requested configuration can be obtained and can then be used at the production end to determine a final, actual configuration. All specified configurations are stored in an accessible manner in a database functioning as a central knowledge base. The information on the actual configuration helps the service personnel determine the components, a term used here to describe both hardware and software components, of which a given vehicle electrical system consists. It can also be used to generate individual documentation on the respective actual configuration for service personnel and for purposes of assembling an individual handbook.

A vehicle electrical system configuration system is known from German patent specification DE 43 15 494 C1. It comprises a vehicle configuration memory located in a central control device, from which memory data are transmitted by the central control device to control devices for purposes of resident or quasi-resident storage therein, so that a newly-installed control device can be programmed accordingly. The vehicle configuration memory can comprise a programmable ROM, such as a FLASHPROM, so as to permanently store the configuration data by conventional means.

The invention's underlying technical problem is to provide a vehicle electrical system configuration system of the type described initially, with which it is possible to continuously obtain, in a relatively uncomplicated manner, an overview of the respective actual configurations and/or to configure a vehicle electrical system, which meets customer-specific requirements, in a user-friendly manner and using a high degree of automation.

The invention solves this problem by providing a novel vehicle electrical system configuration system in accordance with the present invention.

The configuration system according to preferred embodiments of the invention contains a central actual configuration data memory arranged in the vehicle. The actual configuration data set that characterizes the actual configuration is centrally filed therein, so that, by connecting a data-polling component, an overview of the entire current configuration of the vehicle electrical system can be obtained without the need, for example, to access a database maintained by the vehicle manufacturer or various memory components contained in the various hardware components of the vehicle, which only contain data on the respective corresponding hardware component. The actual configuration memory has a direct or indirect communication connection to all installed hardware components, thereby providing a condition for the fact that the actual configuration data stored therein can be compared and/or coordinated with the true actual configuration relatively easily, such as in the case of an unintentional loss of data in the actual configuration data memory. Knowledge of the exact actual configuration is especially useful for servicing and diagnosing the vehicle electrical system, replacing and repairing individual components, determining current values, especially in used vehicles, and assembling individual handbooks for specific vehicles. The storage of actual configuration data in a central location provides a high degree of availability and ensures that data can be updated with relative ease.

In the configuration system according to one embodiment of the invention, the XML file format is used for storage of the actual configuration data in the actual configuration memory. In addition, data on the chosen structure and/or grammar of this file format are stored in a corresponding document type definition file. This makes the actual configuration memory "self-describing," in the sense that the actual configuration data stored therein can still be accessed and displayed after an extended period of time, even if, for example, a browser external to the vehicle originally used to display the display is no longer available.

The configuration system according to another embodiment of the invention contains browser tools with which, depending on the system design, the actual configuration data can be reproduced in a tree structure depiction, a functional depiction, and/or a topology depiction, as well as optionally in one or more other depiction modes, thus providing various ways to view the actual configuration.

In a further embodiment of this configuration system, according to the invention, the actual configuration memory comprises a flash memory component of the control device component of the vehicle electrical system. This special control device component functions simultaneously as a gateway between the vehicle electrical system and a system external to the vehicle, which can, for example, contain browser tools to display the entire Actual Configuration or portions thereof in image form.

The vehicle electrical system configuration system according to the invention characteristically contains a topology configuration system component, a hardware component configuration system component, a vehicle configuration system component, as well as a graphic user/system interface for optional activation of the respective system component and for menu-directed user control while each respective system component is active. Data on the types of usable hardware components and their data network connections can be entered into the configuration system through the topology configuration system component. Approved hardware and software modules and/or elements can be selected and/or newly developed during the development phase using the hardware component configuration system component. When the vehicle configuration system component is activated, the system triggers an essentially or entirely automatic configuration of an optimal vehicle electrical system for the vehicle desired by a customer on the basis of relevant target specifications provided by the customer while using the information provided by the topology configuration system component and the hardware component configuration system component. A conventional "configuration machine" of the type that is already used for configuration of other electrical systems can be used effectively here.

In a system augmented according to the invention, reconfiguration tools are provided with which computer-assisted automatic reconfiguration of a respective vehicle electrical system can be performed if a hardware or software component is replaced with a more recent model which, however, includes at least the functionality of the replaced component. This type of reconfiguration is also possible in conjunction with the addition of a functionality that was previously not part of the vehicle system.

In a configuration system augmented according to the invention, knowledge-aging tools are provided that assign a degree of currentness to the stored configuration data dependent on their age and configuration usage frequency, and remove configuration data from the valid configuration data set if their degree of currentness falls below a specifiable threshold value. In addition to or instead of this measure, the assignment of a degree of currentness to reconfiguration tools, if present, can be used, whenever several possible competing components, configuration strategies, and/or component relationships are under consideration, to always use that with the highest degree of currentness first and only to fall back on those with a lower degree of currentness in case of conflict.

BRIEF DESCRIPTION OF THE DRAWINGS

Preferred embodiments of the invention are depicted in the drawings and are described below.

DETAILED DESCRIPTION OF THE DRAWINGS

Figure 1:
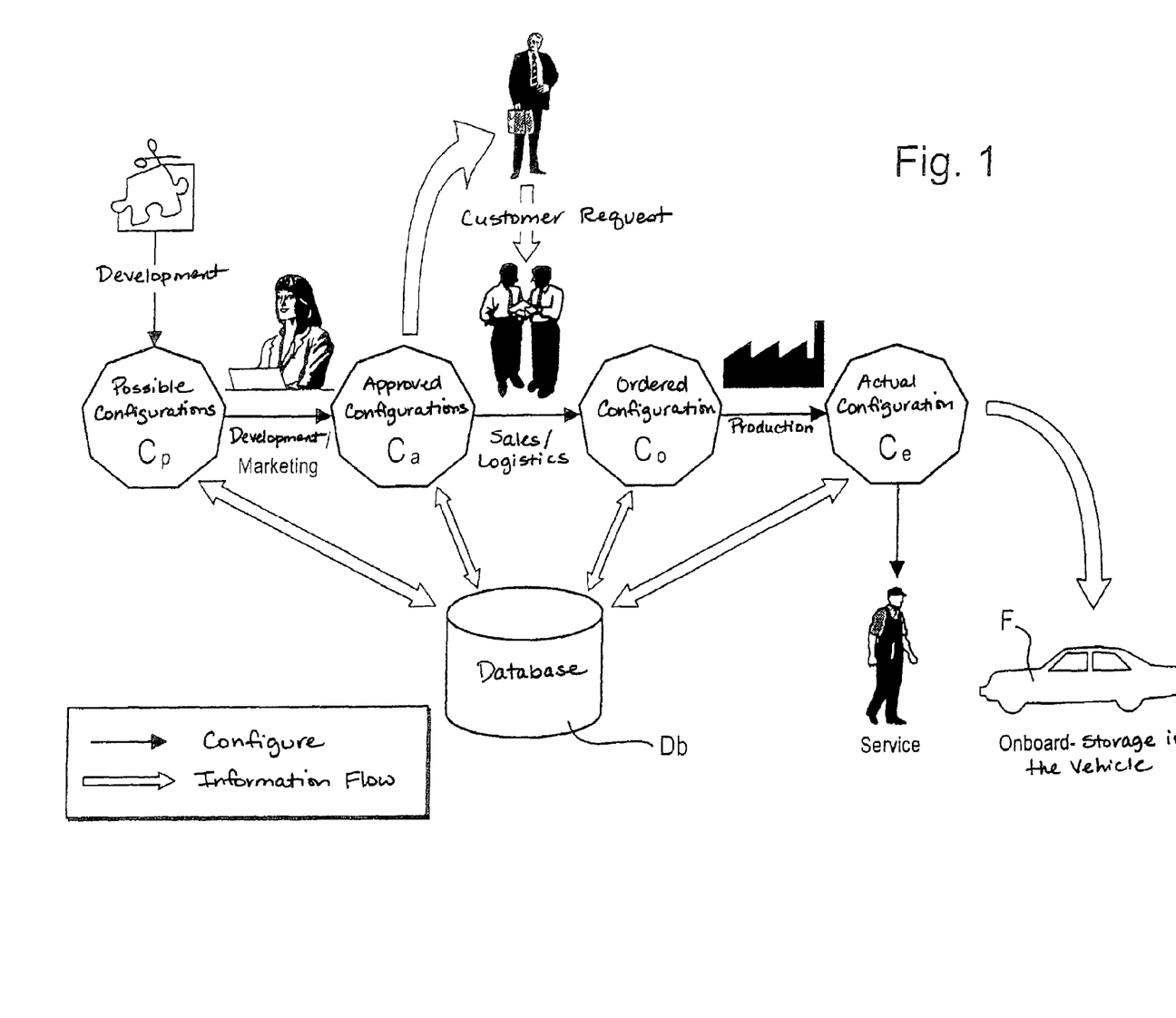
FIG. 1 shows a block diagram depiction of the process chain during the automatic configuration of a vehicle electrical system by a vehicle electrical system configuration system.

FIG. 1 depicts a vehicle electrical system configuration system for automatic configuration of a vehicle electrical system in its configuration process chain during production of the vehicle. As is evident in the figure, the following typical process sequence applies to this case of application of a knowledge-based configuration system.

The system developers manufacture various hardware and software components to fulfill typical vehicle functionalities, which then, together with their corresponding component relationships, i.e., the existing rules and marginal conditions, result in a set $C_p$ of possible configurations. To this end, all subsystems of the vehicle electrical system, such as control device, actuators, sensors, etc., are documented in a single central location, which also includes references to documents that exist externally, such as handbook information or diagnostic modules for a control device function. Interfaces among the existing systems are available in R&D departments for documentation and release of systems for central data storage.

Due to marketing considerations and country-specific regulations, for example, not all possible configurations are meaningful or allowable, which is why a remaining set $C_a$ of allowable, approved configurations is formed based on such conditions. The rules and marginal conditions governing the installation of various electrical/electronic components are also documented in R&D and marketing departments. These rules and conditions may, for example, comprise technical restrictions used to ensure compatibility among specific control devices or strategic marketing restrictions. Such restrictions may, for example, specify that a function which is technically possible may not be used until a specific minimum level of assembly, such as motorization, has been reached. Thus, the set of technically possible configurations $C_p$ and the set of approved configurations $C_a$ are defined by the R&D and marketing departments by means of their establishment of the master specifications, i.e., of planned functionalities, of networking topology, of approved control devices and installation rules, i.e., of component relationships and marginal conditions. Consequently, these configuration quantities contain not only technical information, but also, through rules and external references, the entire range of expert knowledge on installable products.

Using the approved configurations Ca, the optimally appointed configuration $c_o$ corresponding to a requested and ordered vehicle is now determined on the sales end, based on the customer's needs, using computer-assisted automatic configuration. Criteria for optimal configuration include, for example, the costs, the data bus communication and, of course, the lack of conflict in the configured system. In production, the actual configuration $c_e$ of the vehicle electrical system is derived from the ordered configuration $c_o$ during the assembly of the vehicle from individual components. To this end, in particular, the appropriate hardware components, i.e., primarily the various control devices, are selected and the necessary hardware is implemented, for which the required software modules are suitably combined during configuration and are preferably transferred to the vehicle by means of flash software. All specified configurations or configuration sets are stored in an accessible manner in a central database Db. The actual configuration $c_e$, essentially determined by automatic means, is then available to service personnel, for example.

The set of approved configurations $C_a$ is used directly in the sales/logistics area as the knowledge base for a knowledge-based configuration system with which, using automated configuration, information can be generated that is used to prepare a piece list for production, a communication matrix between control devices and data buses, a general circuit diagram based on topology information and the individual circuit diagrams of the control devices, an individual user handbook, and individual diagnostic information from the diagnosis modules for the control devices. The customer's requirements for the vehicle, i.e., the desired scope of operation, serve as the configuration system's configuration objective. In addition, the sales systems can be provided with data from the knowledge bases, i.e., with data on the quantity of approved configurations $C_a$. The marketing departments also specify the information for sales brochures applicable to each function and/or equipment feature. As a result, individual sales brochures can be generated automatically, depending on the customer profile. In this case, the system is not restricted to the vehicle electrical parts system.

The aforementioned piece list also contains information on programming the control devices required by production, i.e., the software modules required by production are identified during configuration and made available to production through references. The piece list is the principal component of the ordered configuration $c_o$. To increase delivery capacity, it can include additional degrees of freedom for production. Thus, for example, production may be given the capability of deciding that for certain functions a few freely-programmable control devices are installed instead of several special-control devices. In this manner, desired functions can be implemented on a case-by-case basis through the use of programmed software modules that are identified by the configuration system. Even if this process is more cost-intensive, it may be advantageous in an individual situation, e.g., to permit faster vehicle production when there is a bottleneck in the supply of a specific control device.

Characteristically, an onboard memory containing the actual configuration $c_a$ of the vehicle electrical system is provided in the ordered vehicle F. The onboard actual configuration memory simplifies not only diagnostic and maintenance work, but also the implementation of new (software) functionalities, the automation of software updates, and the preparation of individual vehicle-specific handbooks. As an additional application, it allows for determination of the value of a used car at any time. The used car dealer can obtain the actual configuration data from the actual configuration data memory in the vehicle and, based on the accessories, can determine the resale value. The onboard actual configuration memory is characteristically provided in a central location in the vehicle.

Figure 2:
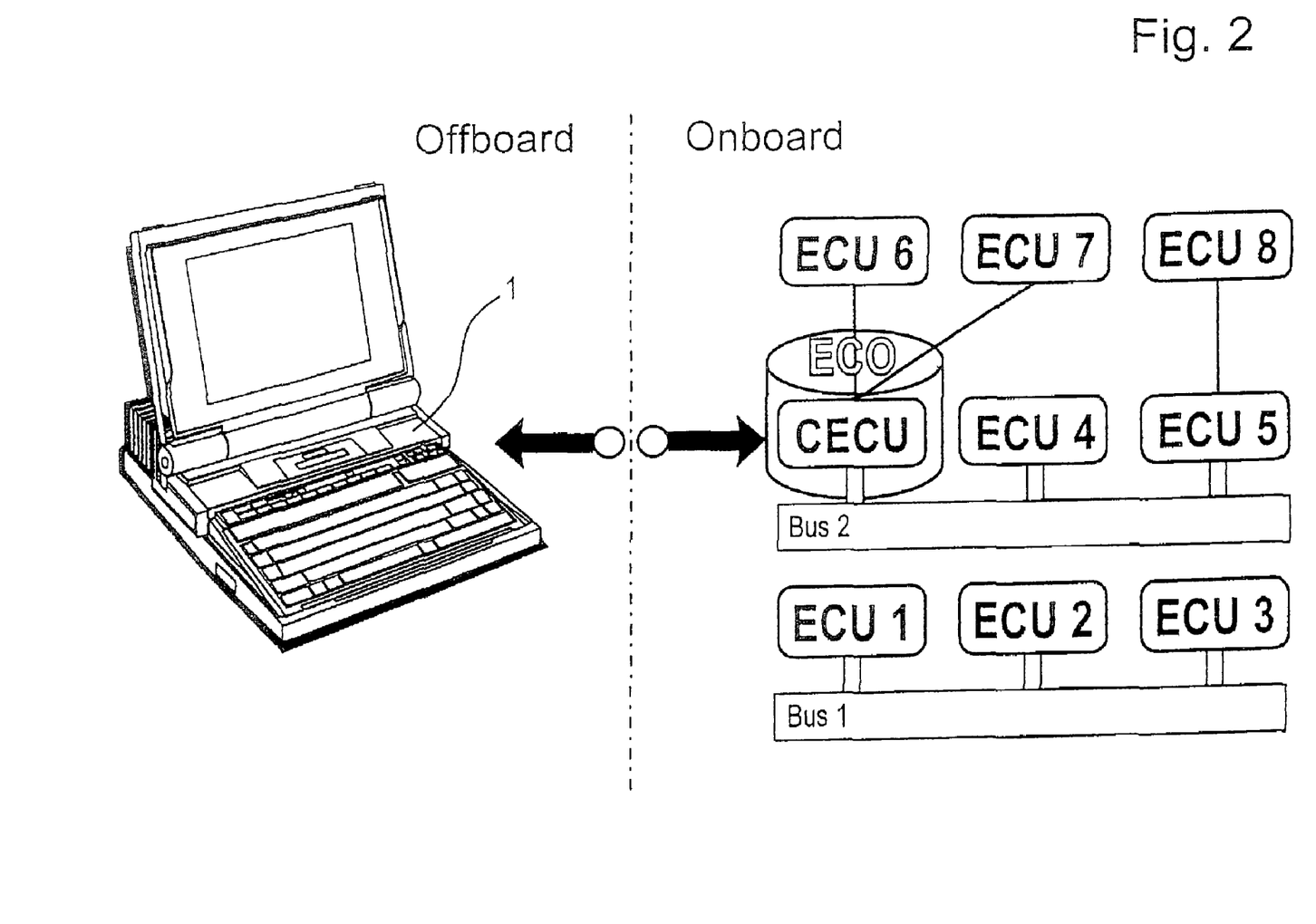
FIG. 2 shows a partial block diagram depiction of an automatically configured vehicle electrical system with multiple data buses and control devices, as well as a central actual configuration memory.

As depicted in FIG. 2, in addition to the remaining hardware components ECU1, ECU2, . . . , the onboard actual configuration is achieved with an additional central control device CECU, which contains a flash memory component or an additional electronic memory, which functions as the actual configuration data memory ECO where the exact actual configuration is stored or, more precisely, where the minimum data required to determine the actual configuration is stored. Thus, the actual configuration data describe all electrical and electronic hardware and software components of the respective vehicle, including their component relationships. Onboard storage of the actual configuration provides for a high degree of currentness, even after several successive system modifications, inherent vehicle-specific documentation, a high degree of availability of the actual configuration as a part of the vehicle, and ease of identification of "invisible" system components, such as software components.

At the same time, the additional central control device CECU functions as a gateway between the vehicle and the environment outside the vehicle. In other words, an external system 1 located outside the vehicle can be connected to this control device CECU for purposes of data communication with the vehicle. Thus, with the external system 1 the actual configuration data stored in the actual configuration data memory ECO of the gateway control device CECU can be accessed and, using a suitable browser, displayed in the desired form.

To ensure that the actual configuration stored in the actual configuration data memory ECO does, in fact, correspond to the actual configuration present, it is provided that each control device component ECU1, ECU2, . . . is capable of identifying itself, and that the central control device CECU, as depicted in FIG. 2, communicates directly or indirectly with each of the other control devices ECU1, ECU2, . . . , wherein the remaining control devices ECU1, ECU2, . . . , are at least partially connected to one or more data buses Bus1, Bus2, . . . , as is customarily the case. In this manner, the actual configuration data stored in the actual configuration data memory ECO can be automatically compared against the real system and, if necessary, can be brought back into conformity with it if, for example, these data are lost due to unintentional failure of the data memory or damage to the central control device CECU.

It is especially advantageous if the onboard documentation made possible by onboard storage of the actual configuration is designed to be self-describing. This makes it possible, even after prolonged periods of time, to read and correctly interpret the stored actual configuration data, even if the offboard system 1 that contains the browser used to display the Actual Configuration is no longer available. This can be achieved by providing that the actual configuration data memory ECO maintains the actual configuration data in a suitable file format and also contains the information for definition of the structure, i.e., the grammatical structure of this file. A suitable file format is the so-called XML (Extensible Mark-up Language) file format, which was published by W3C (World Wide Web Consortium) and represents a subset of SGML (Standard Generalized Mark-up Language). In this system, documents are stored hierarchically and are machine-readable. Thus, for example, tree structures can be stored and their contents interpreted by computers. Tags, which are used to separate and identify data fields, help implement the data in a self-describing manner.

Figure 3:
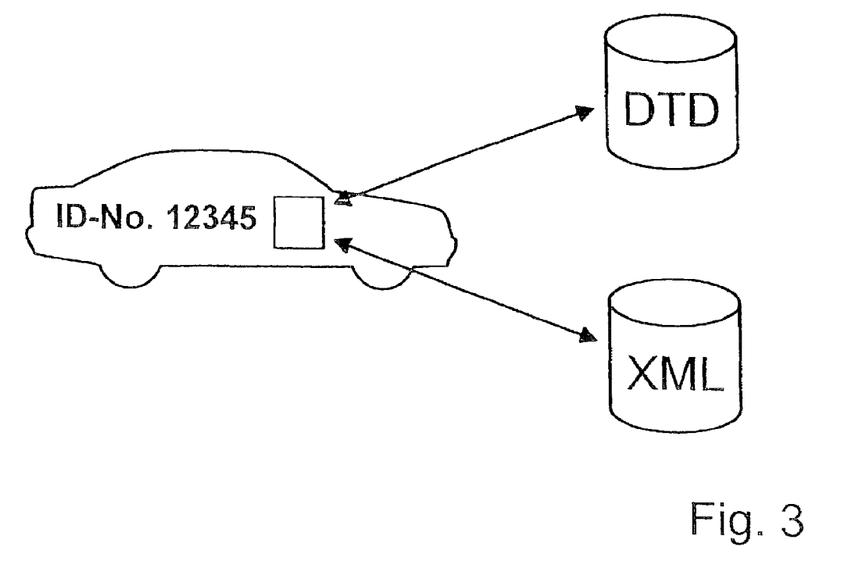
FIG. 3 shows a schematic block diagram depiction of the data structure for the actual configuration memory shown in FIG. 2.

As depicted in FIG. 3, based on the example of a vehicle with a specific identification number "12345," the file's structural and/or grammatical information is defined, together with the actual configuration data stored in XML format, in a DTD (Document Type Definition) file, which is stored in the vehicle together with the XML file. This guarantees, even after many years, consistent, i.e., relevant actual configuration documentation, thus permitting not only the ongoing interpretation of the actual configuration data, but also the modification thereof.

Figure 4:
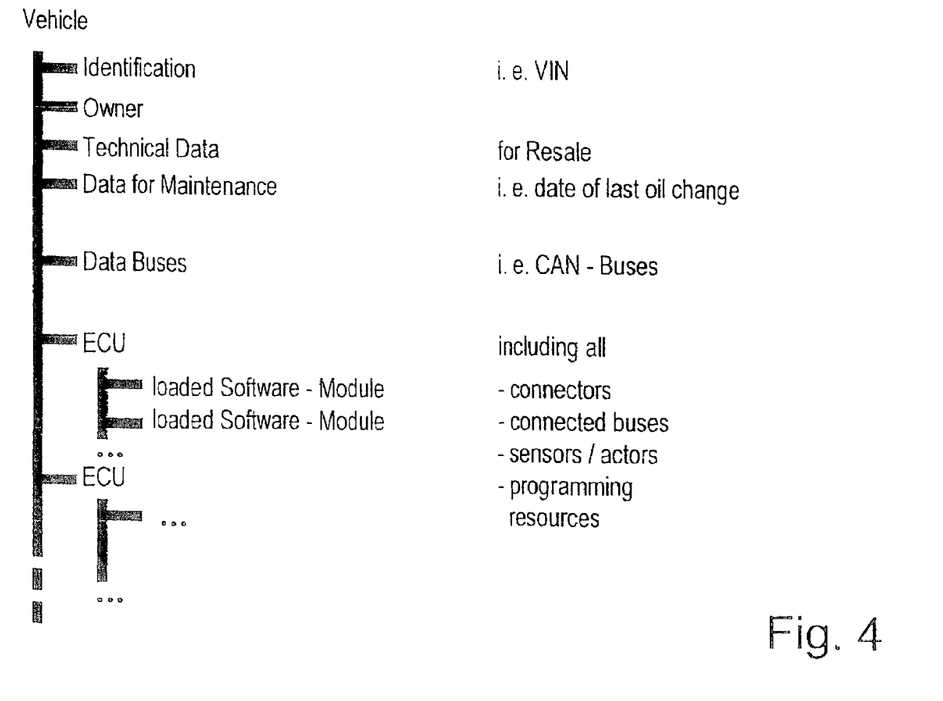
FIG. 4 shows an example of a partial pictorial representation of an actual configuration filed in the actual configuration memory, in a tree structure depiction.

Depending on the system design, various options are available for depicting the actual configuration. A first option, in the form of a tree structure depiction, is partially depicted in FIG. 4, which shows a few of the main branches. As is evident in the figure, the actual configuration data in this case comprise vehicle identification information, information about the owner of the vehicle, information on technical specifications, such as power, vehicle dimensions, etc., which are useful in the event of resale, maintenance-related data, such as the most recent oil change, as well as data relating to the actual vehicle electrical system, such as data on existing data buses and existing hardware and software components. In addition to internal details and the implemented software, the data on the hardware components include data on connectable actuators and sensors, as well as possible resources and resources already in use, such as line connections, connectors, bus identifiers, memory areas, and CPU utilization. This serves as the basis for an examination of hardware and software replacement parts to assess their compatibility with the remainder of the system in the event of replacement of a defective component. As a result of the documentation of the functions of the software modules of a control device, the function of the device itself is also documented. Thus, the stored configuration data contain all information needed to locate all control devices and software modules involved in the execution of a given functionality. If a specific functionality is no longer available, a service department can use a browser for the actual configuration data memory ECO to display all components that may be involved.

Figure 5:
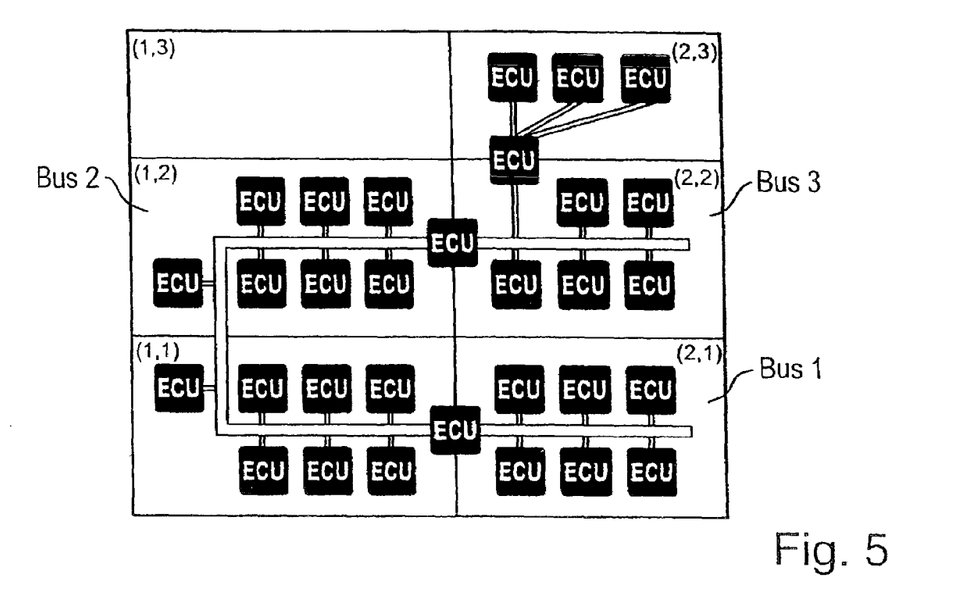
FIG. 5 shows a pictorial representation of an actual configuration, in a topology depiction.

Additional options for depicting the actual configuration are a functional depiction, which is quite easily implemented by sorting all components according to their function and forming a new tree with this information, wherein the branches closest to the base represent the functions, while the adjacent branches represent the hardware and software components used to execute the respective function, as well as a topology depiction, an example of which is provided in FIG. 5. In this type of topology depiction, the control devices connected to data buses serve as a useful starting point for navigating through the stored actual configuration data. The information required for this depiction can be found by sorting through the control devices by their data bus connections, with those control devices that are connected to more than one data bus representing gateways. However, this topology depiction is more difficult to display than a tree structure depiction. An exponentially increasing number of calculation steps is required to prevent the data buses from overlapping, so that the display is often quite complex. Therefore, to simplify the display of this depiction, it is preferable that certain information be additionally stored in the actual configuration data memory ECO.

To this end, an image of topologies for a fully-equipped vehicle, which is normally drawn during vehicle development, is divided into rectangles, each containing no more than one data bus and identified by coordinates. The progression of a data bus can then be stored in the original image as coordinates of the rectangles that contain parts of this data bus. If a drawing is made of the topology of the individual vehicle, the browser can use this coordinate information stored for the various data buses to locate the buses. Gateway control devices are located at the respective margins between pairs of adjacent quadrants. In this manner, a comprehensive topology depiction, as provided in FIG. 5, can be obtained with relatively little computing complexity. By clicking on a respective ECU in this depiction, the user can be taken to corresponding software, corresponding connections, etc. The depiction forms mentioned above and, if applicable, other implemented forms are preferably coded directly in the corresponding browser. The use of the XSL (XML Style Language) format, which will be made available by W3C in the near future, appears to be of interest as a future development in this context. This language helps define depictions of XML data, which can be used in a general XML browser.

Figure 6:
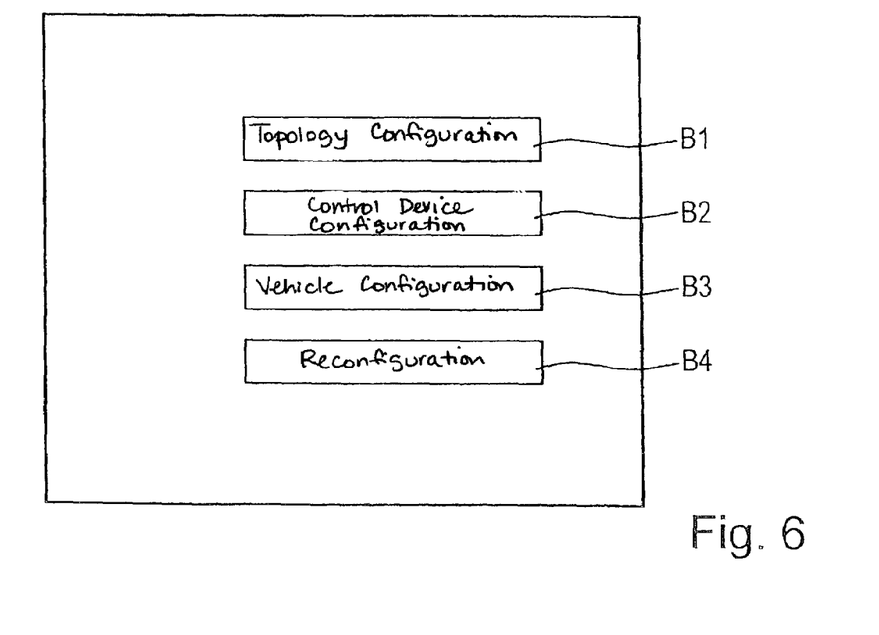
FIG. 6 shows schematically an entry mask of a graphic user/system interface for menu-directed user control during a configuration procedure.

FIGS. 6 to 10 depict, using both schematic images and examples of real screen pages, the user-friendly, menu-controlled (from a suitable graphic user/system interface) guiding of a user through the vehicle electrical system configuration system. FIG. 6 is a schematic depiction of four buttons of an entry mask, with a first button B1 providing access to a topology configuration, a second button B2 providing access to a configuration of control devices, a third button B3 providing access to a vehicle configuration, and a fourth button B4 providing access to a vehicle reconfiguration.

Figure 7:
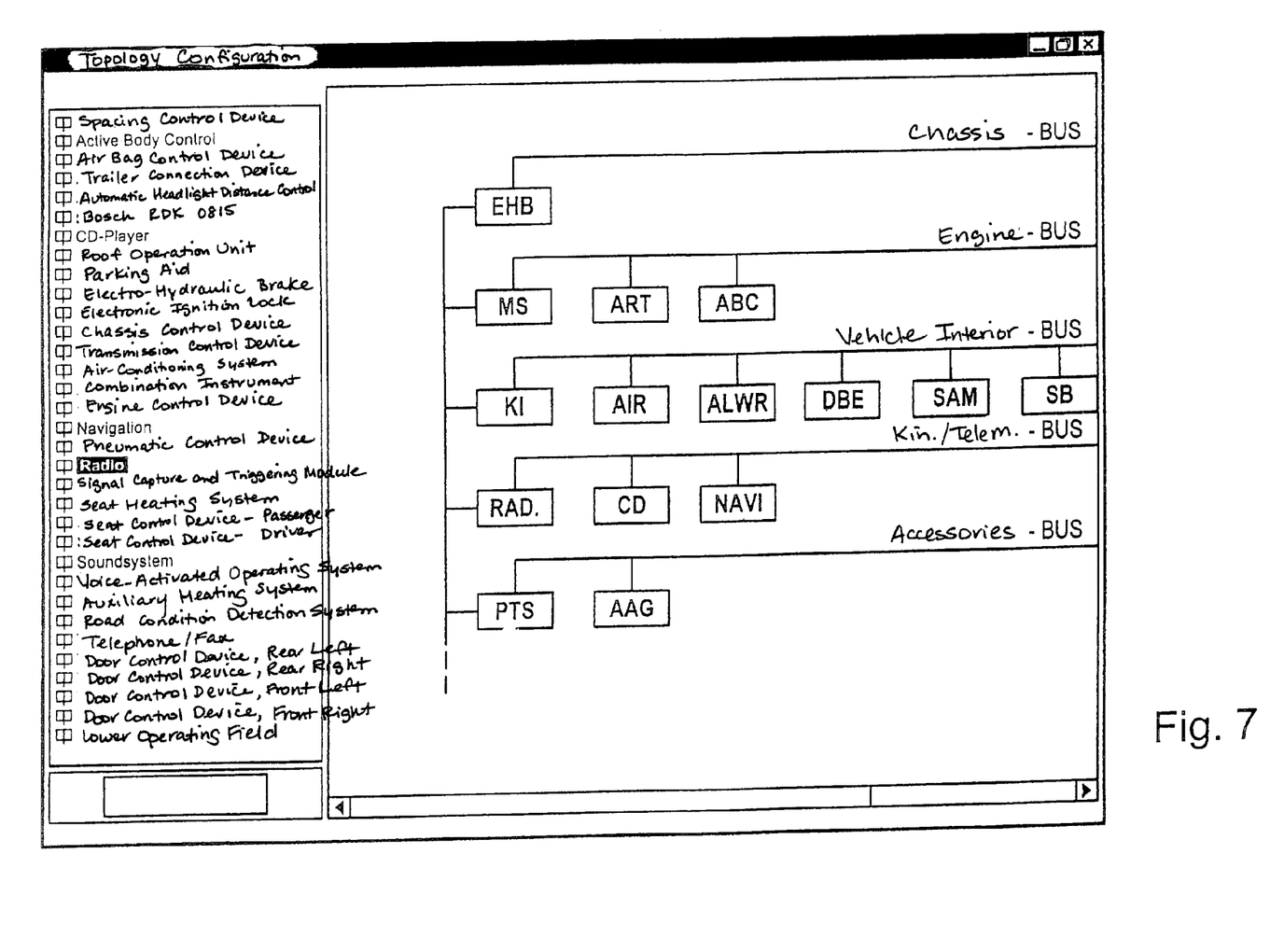
FIG. 7 shows a screen view, provided by the graphic user/system interface, of a topology configuration procedure.
Figure 8:
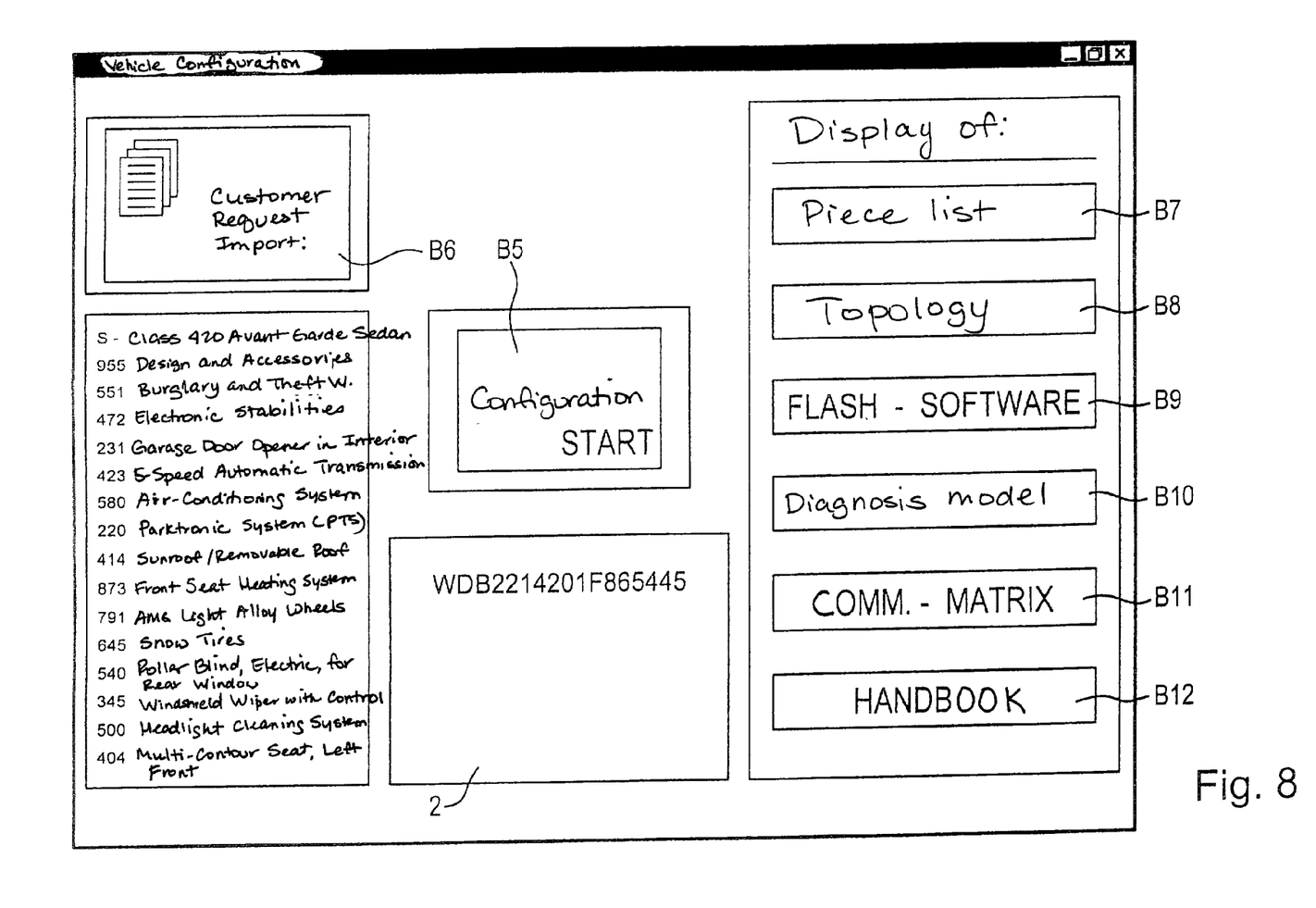
FIG. 8 shows a screen view, provided by the graphic user/system interface, for starting a vehicle configuration procedure and for selecting various display functionalities.

When the user clicks on the first button B1, a topology configuration is activated, during which basic specifications can be established, using the respective screen windows, with respect to which types of control devices are installed and how they are networked. This offers the developer support by contributing experiential values. For example, the applicable topology configuration system segment can at first automatically assign components to those data buses to which they were previously most often assigned. FIG. 7 depicts a typical real screen window during the topology reconfiguration. The control device types still available for selection are listed in the left part of the window, while the control device types that have already been selected, along with their independent assignment to the respective data bus, are shown in the right segment of the system. Examples of what is displayed include an electro-hydraulic brake EHB on a vehicle bus, a motor control device MS, a spacing cruise control device ART and an active body control ABC on an engine bus, various interior space-related components on an interior space bus, such as a combination instrument, air bag control device, automatic headlight distance control, roof operation unit, signal capture and triggering module, voice-activated operating system, various components on a KIN/Telematics bus, such as a radio, CD player, and navigation unit, as well as a pneumatic control device and a trailer connection device on an accessories bus.

In a next step of the menu-controlled configuration, the permissible concrete control devices for the various control device types are released by activation of the control device configuration in R&D or, if these devices are not yet present, they are newly developed. Permissible hardware and software modules for each control device type are selected and/or newly defined, such as a suitable engine control device with suitable corresponding control software. For each individual control device with its corresponding software, features and references to corresponding documentation types are stored.

Clicking on the vehicle configuration button B3 activates the automatic development of an actual configuration, i.e., a computer-assisted automatic configuration of the vehicle with the components of its electrical system corresponding to the information from the topology configuration system component and the control device configuration system component, and with consideration for the objectives resulting from customer wishes. A corresponding menu window is depicted schematically in FIG. 8. A configuration start button B5, with which a configuration procedure can be started, is positioned in the central portion of the window. The totality of functionalities requested by the customer can be selected in the window's left segment B6. In addition to the vehicle identification number, the name and address of the vehicle's owner can be specified in the central, lower window segment 2. A number of display request buttons used to activate specific configuration and display functionalities are located in the right portion of the window.

Figure 9:
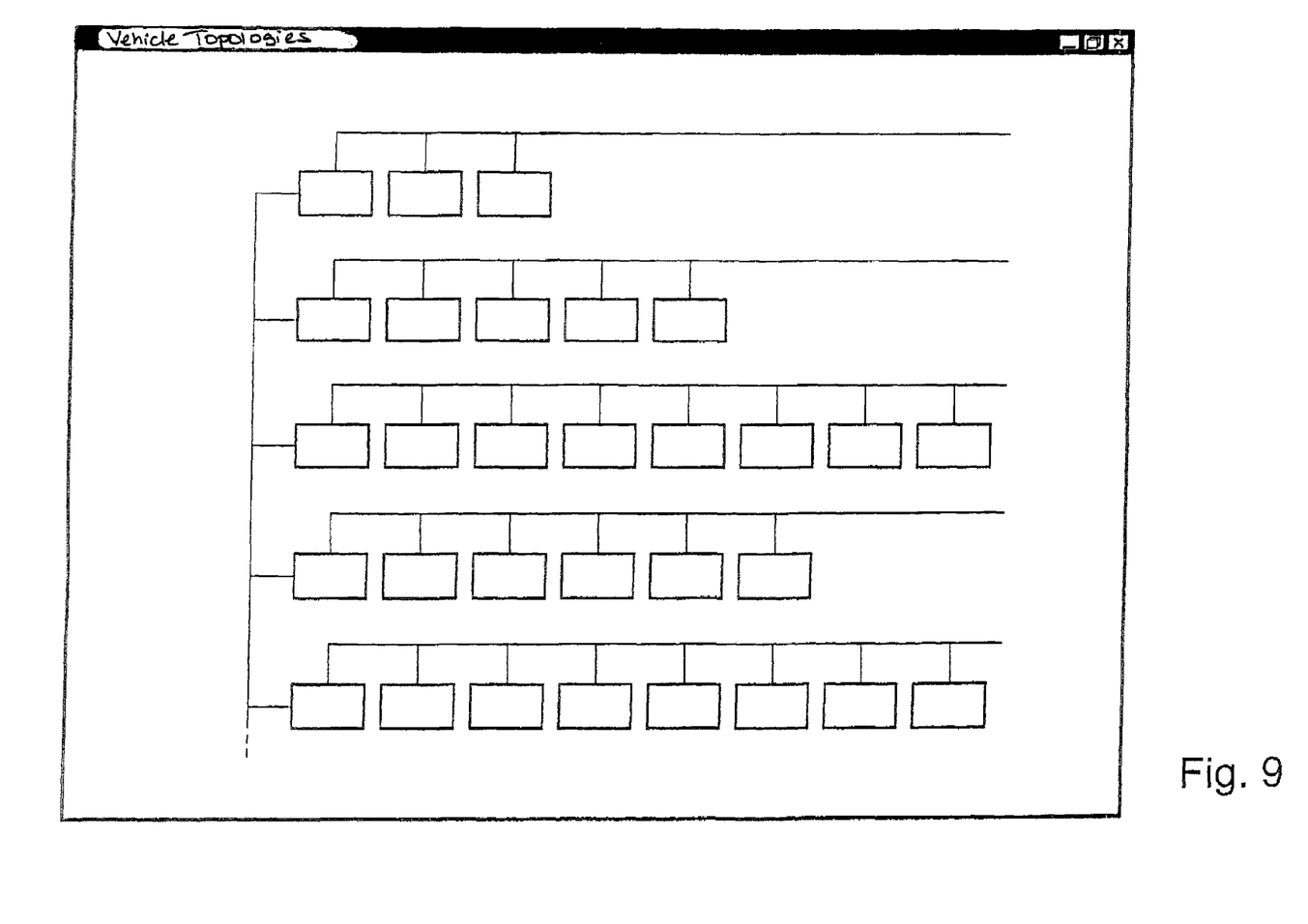
FIG. 9 shows a partial actual configuration view, provided by the graphic user/system interface, in topology depiction.

The preparation of a piece list of recorded actual configurations can be activated by pressing the piece list button B7. The actual configuration in the topology depiction can be displayed by pressing the topology button B8. An excerpt of such a depiction is shown in FIG. 9. As is evident in the figure, this depiction corresponds in principle to the depiction of the topology configuration process shown in FIG. 7. However, the individual control devices specifically selected for the actual configuration obtained are shown in FIG. 9, while FIG. 7 depicts the respective type of control device.

Figure 10:
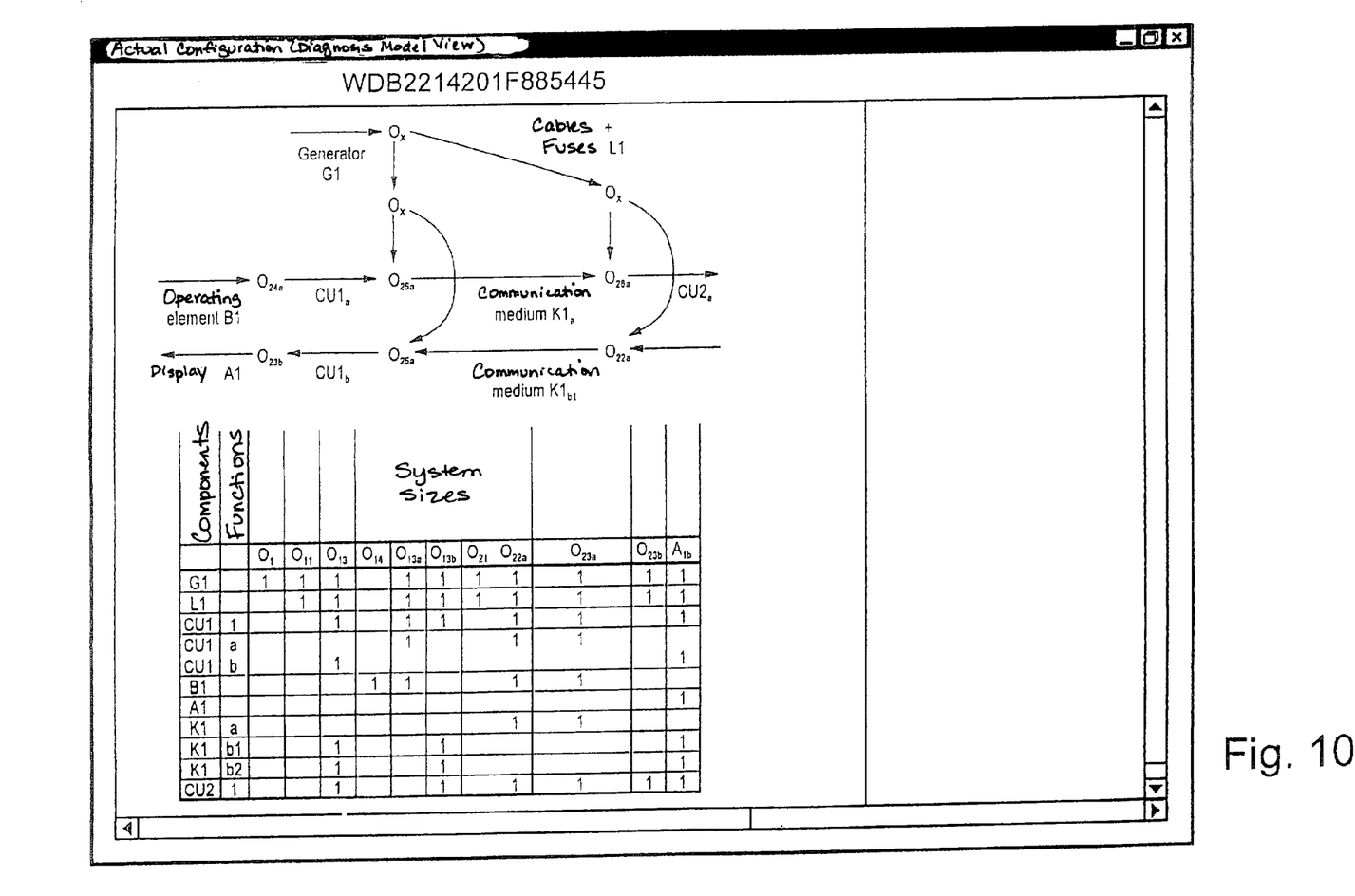
FIG. 10 shows a diagnostic model view, provided by the graphic user/system interface, derived from the actual configuration data.

Using a flash software button B9, the required software modules can be combined during configuration and downloaded to the vehicle using conventional flash software. A diagnostic model button B10 is used to activate a diagnostic model function, with which the referenced diagnostic modules can be assembled to make an individual diagnostic model for the vehicle in question, as well as displayed. FIG. 10 depicts portions of the type of typical diagnostic model depiction that can be generated by the configuration system.

A communication matrix button B11 activates the display of the data bus identifier in use, such as CAN identifier, in the form of a communication matrix. The actual configuration also contains information on all other resources of the control devices being used, such as memory, CPU power, E/A connections, etc. As an additional functionality, an automatic handbook preparation function can be activated by pressing a handbook button B12; this function combines the handbook parts referenced by the control devices into a vehicle-specific handbook. Thus, the user receives precisely those operating instructions that apply to the components installed in his vehicle, without being overloaded with superfluous information on components not in use. The resulting handbook, which is available in electronic form, can be comfortably perused on the screen and printed out if needed.

As the menu guide explained above on the basis of FIGS. 7 to 10 indicates, the user is provided with a very comfortable vehicle configuration procedure controlled by a window-based graphic user/system interface. Another function of the vehicle electrical system configuration system that can be activated through the entry mask depicted in FIG. 6 is the new configuration or reconfiguration option, which is selected by pressing the corresponding reconfiguration button B4. The reconfiguration system component can be used, in particular, to update the actual configuration following a replacement or addition of one or more hardware and/or software components. In the case of component replacement, this function is especially important when the same component is currently unavailable and is replaced with a different type of component, but one offering the same required functionality. This replacement component must fulfill all constraints applicable to the system component in question. The reconfiguration system component provides support in locating a suitable replacement component. The necessary system configuration information on the modules currently installed in the system is then made available by the actual configuration data, which are stored as an XML document in the vehicle's actual configuration data memory.

If, for example, the outside mirror on the passenger side is mechanically damaged, the smallest replaceable unit, which comprises the entire outside mirror unit, including actuator motors and position sensors, together with the mechanical mirror element itself, must be replaced. Although the replacement part contains a mechanically identical unit, it may contain a newer version of, for example, the position sensors, such as one with higher resolution. This replacement part could not be used in conventional systems, as the software within a control device does not match the signals of the position sensor. The reconfiguration system component provides an advantage in this respect, in that it identifies, in a subsequent step, the software module responsible for controlling the position of this outside mirror as being in need of replacement and, in the same manner, indicates other necessary changes. Analogously, a system upgrade to include new functionalities requires the addition of new software and hardware modules, so that all opposing functionalities are sequentially fulfilled in a conflict-free manner. The required changes can be identified relatively easily and accurately by the reconfiguration functionality.

A possible implementation of the reconfiguration system component consists principally of two parts. One part comprises a knowledge base, which contains all necessary knowledge on available components, together with their possible parameters, on the constraints among components, on strategies for the successful replacement of parts, and on which modules are currently in inventory. An object-oriented method, such as that used in the KONWERK project described in the publication by Günter et al. cited above, can be used to model the knowledge. The second part comprises an inference machine operating with the knowledge. The KONWERK kernel can be applied here, as it offers favorable options for insertion of one's own strategies. On the other hand, a resource-based strategy is suitable, as the aforementioned component constraints are based primarily on the available resources of the modules and, consequently, can be very adequately modeled. For a discussion of this issue, see, for example, the publication by Heinrich et al., titled "*The Resource-Based Paradigm: Configuring Technical Systems from Modular Components*," AAAI-96 Fall Sympos. Series: Configuration, MIT, Cambridge, Mass., Nov. 9–11, 1996, page 19.

As described in the publication by Crow et al., titled "*Model-Based Reconfiguration: Diagnosis and Recovery*," Computer Science Laboratory, Menlo Park, Calif. 94025 USA, NASA Contractor Report 4596, May 1994, reconfiguration can be applied to obtain an FDIR system, i.e., a Failure Detection, Identification, and Reconfiguration system, by using diagnosis and reconfiguration in systems with "standby" replacement parts. In the case at hand, however, it is not assumed that there are any "standby" replacement parts, and the reconfiguration is not just limited to the replacement of parts following a diagnosis, but is also suitable for upgrading systems. An initial starting point is a part that requires replacement, such as the last step in an FDIR process chain. The system user identifies the part, and the reconfiguration system removes it from the current system configuration, which is obtained from the stored actual configuration. The configuration system then detects that the system is no longer complete. In this context, completeness means that the system complies with the specification dictated by the functional set previously contained in the system, and that all constraints are fulfilled. The second starting point applies to cases in which a new functionality is to be added. In this case, the system is also no longer complete, its incompleteness being the result of a modified specification comprising the previous functionalities plus the newly-requested functionality.

In both cases, a composition step of the reconfiguration system consists in its attempting to add a component that provides the missing functionality. To do this, it can select the same type of component that the user has previously removed, provided it is still available and has not yet been ordered by someone else. However, the system can also "decide" to select a newer version of the component or a completely different component currently in inventory, depending on the strategy and the optimization rules that are, in fact, being applied. A gradual reconfiguration is usually required to fulfill all constraints. A third relevant situation results when the rules/constraints for the system have changed, e.g., as a result of R&D departments having detected new constraints during a later phase and added them to the knowledge base. The shipment of the vehicle to a different country with other regulations can also serve as a reason for reconfiguration. In this case, the reconfiguration system determines whether all constraints are still fulfilled and, if this is not the case, initiates a gradual reconfiguration.

There are several conventional options for the reconfiguration process. In the publication by Crow et al. mentioned above, reconfiguration is modeled as an analogy to the model-based diagnosis paradigm, as formulated by Reiter (R. Reiter, *A Theory of Diagnosis from First Principles, Artificial Intelligence*, 32 (1), April 1987, page 57). The reconfiguration favored in the case at issue is based on a mechanism that attempts to use as many of the well-researched classic configuration paradigms as possible. This mechanism consists in adding components to obtain a desired functionality. The present reconfiguration component also decomposes the system when a conflict pair is detected. This is similar to the basic configuration method that employs the tracing methods of classic configuration systems, as described in the publications by Günter et al. and Heinrich et al. cited above. The difference between this type of tracing and normal tracing consists in the fact that in addition to those parts that were previously added by the algorithm, parts can also be removed that were installed into the system before the algorithm was started.

A distinction can be drawn between two phases, a composition phase and a tracing or decomposition phase, as parts of the algorithm. During the composition phase, the reconfiguration system attempts to locate a component that provides at least one of the desired functionalities. If one or more desired functionalities is missing, a decision must be made as to which component should be added next. This may, for example, be the component with the largest number of missing functions or the component with the smallest number of conflict pairs. This phase ends when conflict pairs appear or the system is complete with respect to a given specification. During the decomposition phase, the system removes all components that are part of the conflict pair. As the addition of a component during the composition phase can create several conflict pairs, the decomposition phase essentially comprises a loop, in which the components belonging to at least one conflict pair are identified and the next component to be removed under a specific optimization strategy is selected and then removed, wherein, for example, those components that are contained in the largest number of conflict pairs can be removed first. The decomposition phase ends when there are no longer any conflict pairs. Composition and decomposition phases are executed in a loop cycle, until the system is complete with respect to a given specification during the composition phase.

As, particularly in motor vehicles, different versions of hardware and/or software components are often developed during the life of the vehicle, it is advantageous for the reconfiguration system to be capable of approaching the problem of the existence of such different component versions in two different ways. On the one hand, it can determine whether any conflicts arise when a newer version is used, and can also help solve these conflicts by locating alternative components that provide the same functionality. On the other hand, it can identify all components that are to be replaced with a new version, even if they are still operable, if a condition is added to the knowledge base that states that the older version of the part represents a conflict in itself. The reconfiguration algorithm fulfills these two aspects without additional programming expense. The new version of the component must be added to the knowledge base as an available part, and the older version must either be removed from the knowledge base or identified as being no longer available.

Figure 11:
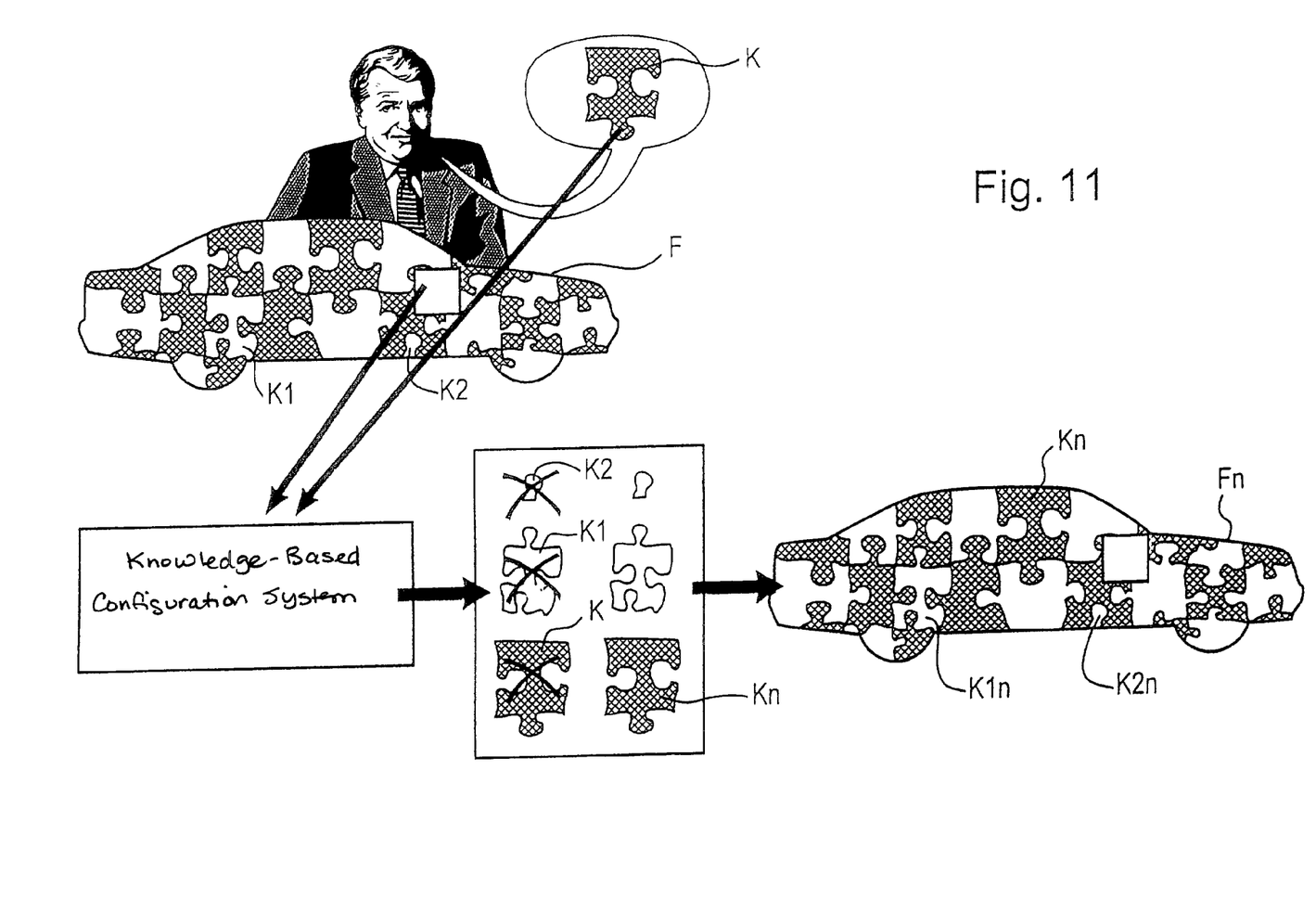
FIG. 11 shows a schematic depiction of a reconfiguration procedure triggered by the configuration system.

FIG. 11 illustrates the reconfiguration function, with the system components depicted symbolically as puzzle parts of the respective vehicle F. It is assumed that, for example, a specific functionality or component K of the existing actual configuration is to be replaced. The knowledge-based configuration system uses its reconfiguration system component to determine, in addition to a new component $K_n$ for the component that is to be replaced in any event, other new components $K1_n$, $K2_n$ in place of corresponding previous components $K1$, $K2$, until the system is once again complete and free of conflict. Through the replacement of the previous components with the independently, newly-determined components, as well as through the possible addition of further components, a newly-configured vehicle $F_n$ is obtained that possesses the desired functionalities.

It is preferably provided that the present vehicle electrical system configuration system reflects an aging aspect of the configuration and/or reconfiguration process. This takes into account the fact that, over the years, changes occur not only in the versions of components, but also in knowledge about constraints or re(configuration) strategies. Consideration for outdated knowledge can improve the reconfiguration process, and it is possible that both the components and the knowledge change continuously and automatically, and not just rapidly during the transition to a new version.

An advantage of the use of outdated knowledge is that it improves the knowledge base, in that knowledge that is not needed over a prolonged period of time is automatically removed from it. This keeps the knowledge base sufficiently small and makes the corresponding configuration machine correspondingly fast. In special cases in which outdated knowledge is needed, such as in the reconstruction of an antique vehicle, it can be helpful to use backup versions of the knowledge base, which make it possible to return to any earlier date.

Another important argument in favor of making allowances for the aging of knowledge is that this may accelerate the configuration process. It is highly likely that knowledge that has frequently been helpful in finding a solution and is relatively current is well-suited for solving a problem being posed currently, so that it is plausible that such knowledge be used first and therefore be designated as current. This means that to accelerate the configuration or reconfiguration process, current components and strategies must be given preference and current constraints must be examined first.

To classify the aging of knowledge, a degree of currentness parameter "act" of the form act=usef/age is defined here as a quotient of a parameter usef, which indicates how often the respective knowledge has led to a solution and/or a component has been part of a solution. In addition, a parameter age is defined that indicates the age of the knowledge and/or of the component since the first time it was stored in the Knowledge Base. If, for a given component and over a longer period of time, this degree of currentness parameter act decreases continuously toward zero, it can be removed from the currently valid knowledge base once it drops below a predetermined threshold value.

Preferably, a weighting of the degree of use parameter usef relative to the age of the respective component can be provided, in that the degree of currentness act is determined on the basis of the modified relation act=usef$^c$/age, wherein a suitable value for the exponent c can be defined. Specifically, to emphasize age this exponent is set to a value within the interval between zero and one and, to emphasize the degree of use, to a value greater than one. For purposes of calculating the degree of currentness act, the parameters usef and the "date of birth" are stored in the knowledge base for all knowledge and all components. The exponent c is valid for the entire system and can be redefined for each reconfiguration process, thus enabling the system user to determine the importance of the age accordingly.

The invention claimed is:

1. Vehicle electrical system configuration system for automated configuration of vehicle electrical systems, which comprise hardware components at least partially connected to a data bus network and software components implemented in at least a portion of the hardware components for executing corresponding functionalities, comprising:
   a central actual configuration data memory arranged in a vehicle for accessible storage of an actual configuration data set characterizing an actual configuration of the vehicle electrical system;
   wherein the actual configuration data memory is in direct or indirect communication with all hardware components; and
   further wherein the actual configuration data in the actual configuration data memory are stored in an XML file format and data on their structure are filed in a corresponding document type definition file (DTD).

2. Vehicle electrical system configuration system according to claim 1, wherein the actual configuration data memory comprises a flash memory component of a control device component, which functions as a gateway between the vehicle electrical system and a connectable system external to the vehicle.

3. Vehicle electrical system configuration system according to claim 2, further comprising:
   a topology configuration system component for entry of data on types of usable hardware components and on their data network connection;
   a hardware component configuration system component for selecting and/or newly developing hardware components of the respective type;
   a vehicle configuration system component for computer-assisted automatic configuration of a respective vehicle electrical system in dependence on definable objectives and using the topology configuration system component and the hardware configuration system component; and
   graphic user/system interface tools for menu-directed user control during the activity of the topology configuration system component, the hardware component configuration system component, and the vehicle configuration system component.

4. Vehicle electrical system configuration system according to claim 2, further comprising:
   reconfiguration tools for computer-assisted automatic reconfiguration of a respective vehicle electrical system during replacement of at least one component with at least one new component with a like function but of a different type, or during an addition of at least one additional component for a new functionality, or during modification of at least one component relationship.

5. Vehicle electrical system configuration system according to claim 2, further comprising:
   knowledge-aging tools, which assign a degree of currentness to stored configuration data in dependence on their age and frequency of configuration use, wherein said knowledge-aging tools remove the configuration data from a valid configuration data set when their degree of currentness has dropped below a definable threshold, and/or wherein for existing reconfiguration tools, the degree of currentness is said existing reconfiguration tools first use, and for the case of multiple possible components, configuration strategies, and/or component relationships, those with the highest degree of currentness.

6. Vehicle electrical system configuration system according to claim 1, further comprising:
   a topology configuration system component for entry of data on types of usable hardware components and on their data network connection;
   a hardware component configuration system component for selecting and/or newly developing hardware components of the respective type;
   a vehicle configuration system component for computer-assisted automatic configuration of a respective vehicle electrical system in dependence on definable objectives and using the topology configuration system component and the hardware configuration system component; and graphic user/system interface tools for menu-directed user control during the activity of the topology configuration system component, the hardware component configuration system component, and the vehicle configuration system component.

7. Vehicle electrical system configuration system according to claim 1, further comprising:
reconfiguration tools for computer-assisted automatic reconfiguration of a respective vehicle electrical system during replacement of at least one component with at least one new component with a like function but of a different type, or during an addition of at least one additional component for a new functionality, or during modification of at least one component relationship.

8. Vehicle electrical system configuration system according to claim 7, further comprising:
knowledge-aging tools, which assign a degree of currentness to stored configuration data in dependence on their age and frequency of configuration use, wherein said knowledge-aging tools remove the configuration data from a valid configuration data set when their degree of currentness has dropped below a definable threshold, and/or wherein, for existing reconfiguration tools, the degree of currentness is said existing reconfiguration tools first use, and for the case of multiple possible components, configuration strategies, and/or component relationships, those with the highest degree of currentness.

9. Vehicle electrical system configuration system according to claim 1, further comprising:
knowledge-aging tools, which assign a degree of currentness to stored configuration data in dependence on their age and frequency of configuration use, wherein said knowledge-aging tools remove the configuration data from a valid configuration data set when their degree of currentness has dropped below a definable threshold, and/or wherein, for existing reconfiguration tools, the degree of currentness is said existing reconfiguration tools first use, and for the case of multiple possible components, configuration strategies, and/or component relationship, those with the highest degree of currentness.

10. Vehicle electrical system configuration system for automated configuration of vehicle electrical systems, which comprise hardware components at least partially connected to a data bus network and software components implemented in at least a portion of the hardware components for executing corresponding functionalities, comprising:
a central actual configuration data memory arranged in a vehicle for accessible storage of an actual configuration data set characterizing an actual configuration of the vehicle electrical system;
wherein the actual configuration data memory is in direct or indirect communication with all hardware components; and
further comprising browser tools for reproduction of the actual configuration data in at least one of a tree structure depiction, a functional depiction, and a topology depiction.

11. Vehicle electrical system configuration system according to claim 10, wherein the actual configuration data memory comprises a flash memory component of a control device component, which functions as a gateway between the vehicle electrical system and a connectable system external to the vehicle.

12. Vehicle electrical system configuration system according to claim 10, further comprising:
a topology configuration system component for entry of data on types of usable hardware components and on their data network connection;
a hardware component configuration system component for selecting and/or newly developing hardware components of the respective type;
a vehicle configuration system component of the respective type; configuration of a respective vehicle electrical system in dependence on definable objectives and using the topology configuration system component and the hardware configuration system component; and
graphic user/system interface tools for menu-directed user control during the activity of the topology configuration system component, the hardware component configuration system component, and the vehicle configuration system component.

13. Vehicle electrical system configuration system according to claim 10, further comprising:
reconfiguration tools for computer-assisted automatic reconfiguration of a respective vehicle electrical system during replacement of at least one component with at least one new component with a like function but of a different type, or during an addition of at least one additional component for a new functionality, or during modification of at least one component relationship.

14. Vehicle electrical system configuration system according to claim 10, further comprising:
knowledge-aging tools, which assign a degree of currentness to stored configuration data in dependence on their age and frequency of configuration use, wherein said knowledge-aging tools remove to configuration data from a valid configuration data set when their degree of currentness has dropped below a definable threshold, and/or wherein, for existing reconfiguration tools, the degree of currentness is said existing reconfiguration strategies, and/or component relationships, those with the highest degree of currentness.

15. Vehicle electrical system configuration system for automated configuration of vehicle electrical systems, which comprise hardware components at least partially connected to a data bus network and software components implemented in at least a portion of the hardware components for executing corresponding functionalities, comprising:
a central actual configuration data memory arranged in a vehicle for accessible storage of an actual configuration data set characterization an actual configuration of the vehicle electrical system;
wherein the actual configuration data memory is in direct or indirect communication with all hardware components;
further wherein the actual configuration data in the actual configuration data memory are stored in an XML file format and data on their structure are filed in a corresponding document type definition file (DTD); and
further comprising browser tools for reproduction of the actual configuration data in at least one of a tree structure depiction, a functional depiction, and a topology depiction.

16. Vehicle system configuration system for automated configuration of vehicle electrical systems, which comprise hardware components at least partially connected to a data bus network and software components implemented in at least a portion of the hardware components for executing corresponding functionalities, comprising:
a topology configuration system component for entry of data on types of usable hardware components and on their data network connection;

a hardware component configuration system component for selecting and/or newly developing hardware components of the respective type;

a vehicle configuration system component for computer-assisted automatic configuration of a respective vehicle electrical system in dependence on definable objectives and using the topology configuration system component and the hardware configuration system component; and graphic user/system interface tools for menu-directed user control during the activity of the topology configuration system component, the hardware component configuration system component, and the vehicle configuration system component.

17. Vehicle electrical system configuration system according to claim 16, further comprising:

reconfiguration tools for computer-assisted automatic reconfiguration of a respective vehicle electrical system during replacement of at least one component with at least one new component with a like function but of a different type, or during an additional of at least one additional component for a new functionality, or during modification of at least one component relationship.

18. Vehicle electrical system configuration system according to claim 16, further comprising:

knowledge-aging tools, which assign a degree of currentness to stored configuration data in dependence on their age and frequency of configuration use, wherein said knowledge-aging tools remove the configuration data from a valid configuration data set when their degree of currentness has dropped below a definable threshold, and/or wherein, for existing reconfiguration tools, the degree of currentness is said existing reconfiguration tools first use, and for the case of multiple possible components, configuration strategies, and/or component relationships, those with the highest degree of currentness.

* * * * *